United States Patent
Happas et al.

(10) Patent No.: US 12,019,643 B2
(45) Date of Patent: *Jun. 25, 2024

(54) MATCHING SYSTEM AND DISPLAY METHOD USING REAL-TIME EVENT PROCESSING

(71) Applicant: Conversion Squared Corporation, Addison, TX (US)

(72) Inventors: Stephen Happas, Braintree, MA (US); Hisham Mardam-Bey, Montreal (CA); Brian McDonald, Saint-Laurent (CA); Jordan Bateman, Montreal (CA)

(73) Assignee: Conversion Squared Corporation, Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,682

(22) Filed: Jan. 24, 2023

(65) Prior Publication Data

US 2023/0177060 A1  Jun. 8, 2023

Related U.S. Application Data

(63) Continuation of application No. 17/592,187, filed on Feb. 3, 2022, now Pat. No. 11,561,989.

(60) Provisional application No. 63/145,700, filed on Feb. 4, 2021.

(51) Int. Cl.
*G06F 16/00* (2019.01)
*G06F 16/2458* (2019.01)

(52) U.S. Cl.
CPC ............... *G06F 16/2471* (2019.01)

(58) Field of Classification Search
CPC .................................... G06F 16/2471
See application file for complete search history.

(56) References Cited

U.S. PATENT DOCUMENTS

| | | | | |
|---|---|---|---|---|
| 9,342,855 B1* | 5/2016 | Bloom | ............... | G06V 20/30 |
| 10,091,312 B1* | 10/2018 | Khanwalkar | ........... | H04L 67/02 |
| 2004/0260781 A1* | 12/2004 | Shostack | ............... | G06Q 30/02 |
| | | | | 709/207 |
| 2006/0210125 A1* | 9/2006 | Heisele | ............... | G06V 40/171 |
| | | | | 382/118 |
| 2008/0188290 A1* | 8/2008 | MacGuire | ............... | G07F 17/32 |
| | | | | 463/22 |
| 2010/0262611 A1* | 10/2010 | Frind | ............... | G06F 16/335 |
| | | | | 707/769 |
| 2012/0054116 A1* | 3/2012 | Wallin | ............... | G06Q 30/02 |
| | | | | 705/319 |
| 2012/0130823 A1* | 5/2012 | Levin | ............... | G06Q 30/0241 |
| | | | | 705/14.69 |

(Continued)

*Primary Examiner* — Alexander Khong
(74) *Attorney, Agent, or Firm* — David H. Judson

(57) ABSTRACT

The subject matter herein provides for online dating gameplay that offers instant and ongoing new opportunities for content, interaction, communication, and risk, and that rewards communication initiation and persistence, all without increasing the skill level required to find a relationship while providing an incentive to play or engage with the online dating community continuously. The approach employs gamification (and, in particular, a slot machine-style display) to encourage users (sometimes referred to herein as "daters" or "players") to frequently log in and engage with other daters.

10 Claims, 10 Drawing Sheets

(56) References Cited

U.S. PATENT DOCUMENTS

| | | | |
|---|---|---|---|
| 2012/0290978 A1* | 11/2012 | Devecka | G06Q 30/0273 |
| | | | 715/810 |
| 2013/0124638 A1* | 5/2013 | Barreto | H04L 65/403 |
| | | | 709/205 |
| 2013/0198281 A1* | 8/2013 | Scuba | H04L 63/0421 |
| | | | 709/204 |
| 2014/0074824 A1* | 3/2014 | Rad | G06Q 30/02 |
| | | | 707/722 |
| 2019/0108217 A1* | 4/2019 | Chen | G06F 40/289 |

* cited by examiner

MATCHING SYSTEM AND DISPLAY METHOD USING REAL-TIME EVENT PROCESSING

BACKGROUND

Technical Field

This application relates generally to the field of recreation, social sites gaming, and personals, and online dating. As one example use case, the subject matter herein relates to online dating, wherein a user creates an online dating profile, and has the ability to search and review other users' online profiles to like, match, message, and possibly engage in a relationship online and offline.

Background of the Related Art

Personals and online dating is ubiquitous in today's society. Prior to the Internet, personals were placed in local newspapers and magazines; with the advent of the Internet, online dating has become an increasingly popular way for individuals to meet and form relationships.

Traditional online dating sites do not create enough opportunities for excitement, communication between users, and instant gratification—factors that entice the user to use the system more often to attempt to contact more potential matches and thereby increase the user's likelihood of forming relationships online and offline. Online dating users get the most excitement and satisfaction from receiving likes, and messages from other online daters; however, success often depends on (1) the user creating an appealing profile with photos, (2) the user initiating communications with many others who are using the system, (3) patience in awaiting a reply, and (4) persistence. Online dating often "feels" like a game of chance where success depends on the right two people engaging in online dating at the right moment.

Because getting users to be actively involved in initiating communication with other users is what generates revenue (via transaction fees, advertising, data collection, related sales opportunities, or subscription models), maximizing user engagement is not only good for the users, but also for the online dating provider.

Traditional dating website and mobile app interactions with those sites do not adequately address these challenges. Therefore, there exists a need to provide a type of online dating gameplay that offers instant and ongoing new opportunities for content, interaction, communication, and risk that rewards communication initiation and persistence, without increasing the skill level required to find a relationship while providing an incentive to play or engage with the online dating community continuously. Further, the system must be architected in a manner that facilitates this type of interactivity regardless of the number of users and their activity levels.

BRIEF SUMMARY

The subject matter herein provides for online dating gameplay that offers instant and ongoing new opportunities for content, interaction, communication, and risk, and that rewards communication initiation and persistence, all without increasing the skill level required to find a relationship while providing an incentive to play or engage with the online dating community continuously. The approach employs gamification (and, in particular, a slot machine-style display) to encourage users (sometimes referred to herein as "daters" or "players") to frequently log in and engage with other daters.

In particular, the subject matter herein describes an online dating game and a method of conducting an online dating game in which the user potentially initiates communication with another user based on the result of a casino-style slot machine apparatus. According to this method of play, the result of each "play" on the slot machine-like apparatus is one or more user profiles that the dater/player can "lock-in" or "like," which may initiate communication between the individuals. As nouns, the terms "play" and "spin" are used interchangeably herein and are used to denote the action required to initiate a new grouping of possible matches. In this approach, new potential matches are acquired via this process, preferably on a regular basis.

The above described functionality is enabled using a real-time event engine that leverages distributed queueing and event processing using a producer/consumer model that allows the entire system to function in a reactive manner responding to user activities in real-time instead of having to poll and check participating user devices continuously, which would otherwise waste precious resources and adding system overhead.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 7 depicts the user selecting to "lock-in" another user, who is then notified of having received a like;

DETAILED DESCRIPTION

Figure 1:
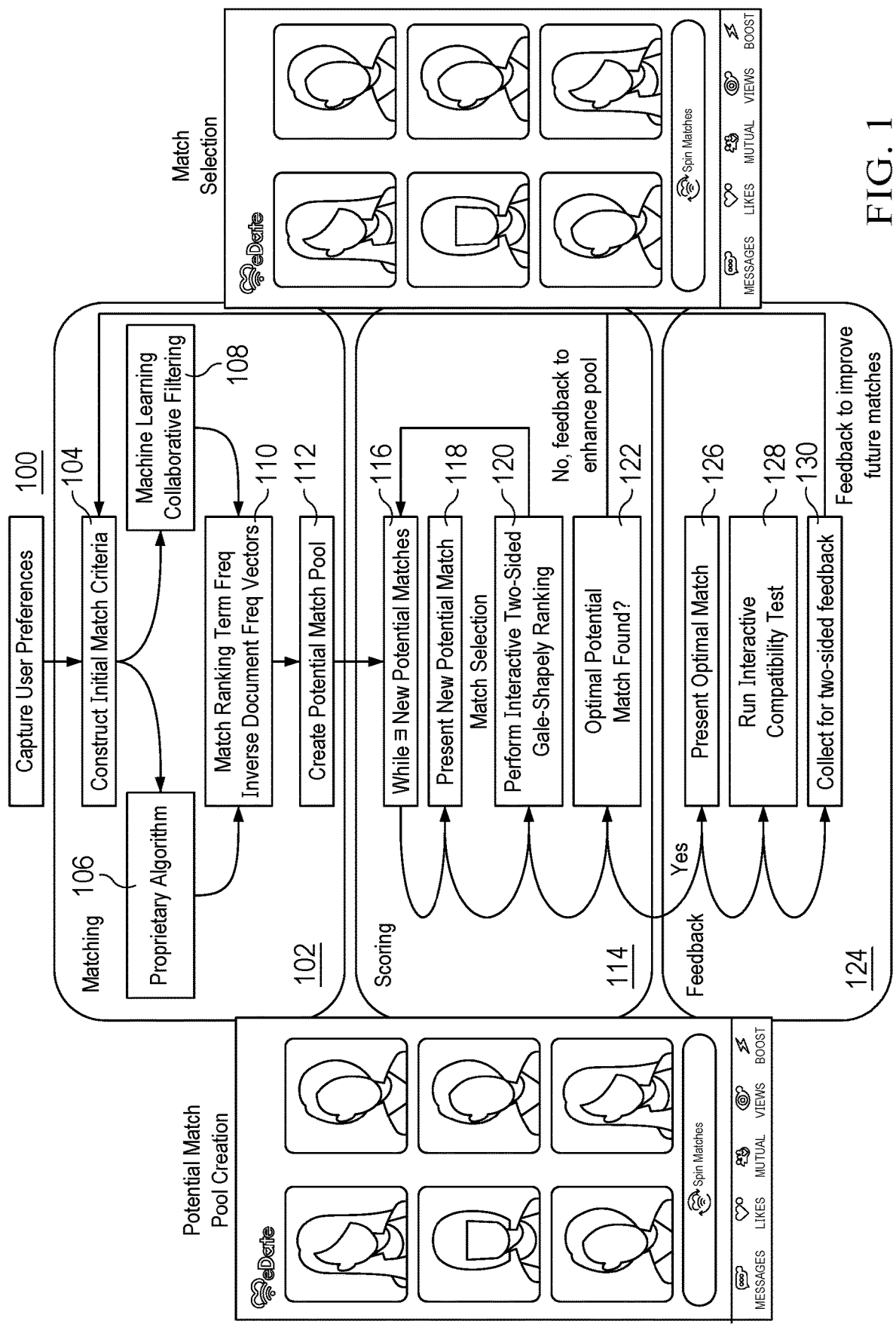
FIG. 1 depicts a high level operation of matching, scoring and feedback mechanism according to an embodiment of this disclosure.

As noted above, and in an exemplary (but non-limiting) embodiment, a representative domain in general is online dating. To this end, participating end users typically interact with the service using mobile devices (smartphones and tablets), although this is not a limitation, as an end user may view content on any computing device, such as a laptop, a desktop, a workstation, a Web-connected appliance, and the like. Preferably, an end user accesses the service using a mobile device that comprises a CPU (central processing unit), computer memory, such as RAM, and a drive. The device software includes an operating system (e.g., Apple® iOS, Google® Android™, or the like), and generic support applications and utilities. The device may also include a graphics processing unit (GPU). It also includes a touch-sensing device or interface configured to receive input from a user's touch and to send this information to processor. The touch-sensing device typically is a touch screen. The touch-sensing device or interface recognizes touches, as well as the position, motion and magnitude of touches on a touch sensitive surface (gestures). The device typically also comprises a high-resolution camera for capturing images, an accelerometer, a gyroscope, and the like. Any push notification implemented in the service may be provided to the mobile device in any convenient manner, e.g., Apple Push Notification (APN) Service (APN), Google push notification services (for iOS or Android), or the like.

According to an aspect of this disclosure, a user's mobile device executes a browser, browser plug-in, or dedicated mobile app that provides a user interface for rendering a set of display screens/panels, preferably in the style of a slot machine. Like a slot machine, which normally generates random combinations of symbols on a dial, with certain combinations winning varying amounts of money for the player, the display here depicts potential "match" candidates. In a representative use case, a user lands on the "Spin-A-Match™" first page (after a login) and selects an option to "Spin Matches" or the like. After making this selection, the app executes a slot machine-style action (e.g., spinning match candidate images) until a particular image or images corresponding to the match candidates selected by the system algorithms are rendered. If the user likes what he or she sees, he or she can drill down and view the potential match's profile; if the user does not like what he or she sees, he or she can spin again, just as in a casino-style game.

As will be described, and for each user, the system determines a pool of user-profiles (sometimes referred to as "matches") that the system considers (selects) to be potential candidates for matching with the user. The system selects the pool of user-profiles based on the participants' user preferences, past match activity, and other factors. A participating user's mobile device (or other computing device) is configured with a mobile app (or native or web application) that provides a display interface that includes a slot machine-like apparatus. The slot machine-like apparatus provides the user (the "player") a limited number of spins through which the user can attempt to "lock-in" or "like" a match. In a typical play scenario, each "spin" of the slot machine-like apparatus produces a grouping of two (2) or more local (to the user) profiles chosen randomly from a database of potential matches and their associated profiles. Once the spin animation ceases, the user can "lock-in" one or more profiles, e.g., by making a selection to this effect. Upon lock-in of a profile by the user, preferably the locked-in profile user is then sent a "like" notification. In the event the locked-in profile user has already "liked" the user/player, the locked-in profile user is also sent a "match" notification. The user/player can then spin again, and repeat the process until the number of available spins is exhausted.

Clients (e.g., mobile devices executing the mobile app) act as a front-end to the service, which includes back-end operations as depicted in FIG. 1. Although not shown in detail, a user registers with the service, e.g., by providing login details such as user identifier and password. Other login techniques, e.g., federated login, social login, or the like, may be used. During his or her registration, the user provides personal data that is typical of a dating site/application, and that information is stored in the user's profile (a data record). As depicted at step 100 in FIG. 1, the user's preferences are captured and provided to a matching mechanism 102. As will be described in more detail below, the matching mechanism comprises a set of functions, typically implemented as computer software, executing in the back-end infrastructure (e.g., one or more application servers, one or more associated database servers, etc.). At step 104, the matching mechanism constructs a set of initial match criteria corresponding to the user preferences. The initial match criteria are then supplied to algorithm component 106, which instantiates a basic set of matching rules that the system has accumulated and that are used to make match recommendations, and optionally to a machine learning collaborative filtering component 108, which applies the match criteria against a learned model of what the system has already learning based on past matching activity. The outputs of the algorithm component 106 and the collaborative filtering component 108 are provided to a match ranking component 110. Match ranking component 110 preferably executes a search engine function, preferably using term frequency-inverse document frequency (TF-IDF) vectors, to create a potential "local" match pool for the user. This is step 112. A "local" match is one that is within some defined geographic proximity (e.g., the same city, zip code, physical location, etc.). The match pool may be created each time the user logs into the service, or periodically (e.g., daily), or upon some other condition or event. The match pool includes a set of potential candidate matches for the user based on his or her user preferences (the user's profile) with respect to the profiles of other users registered to the system, all as filtered through the algorithm 106 and ML model(s) 108.

Preferably, users who sign up with the service are indexed in near real-time in the search engine to become part of the potential pool of matches. As noted above, preferably the engine uses TF-IDF vectors and tracks various user attributes, such as: location, ethnicity, activity in the system, the gender of the match they are seeking, and several others, to evaluate relevance based on statistical measures and knowledge derived from human behavior. In information retrieval, TF-IDF is a numerical statistic that is intended to reflect how important a word is to a document (a profile) in a collection or corpus, here the set of profiles of the all the users. The TF-IDF value for a given word increases proportionally to the number of times a word appears in the document and is offset by the number of documents in the corpus that contain the word, which helps to adjust for the fact that some words appear more frequently in general. In addition, preferably the search engine also uses query elevation to boost users who have purchased premium subscriptions, although this boost does not impair the overall matching algorithm. Further, preferably, the search engine uses absolute re-ranking in cases where it can increase the likelihood of mutual-like and hence a match happening if one user has explicitly expressed interest in the other. This re-ranking typically overrides other criteria.

Referring back to FIG. 1, the potential match pool is then available to a scoring mechanism 114, which mechanism operates in real-time in response to a user playing the game with his or her mobile device and its slot machine-like apparatus. In this example, assume the player has initiated a game by selecting a given control (e.g., "Spin Matches"), which preferably initiates a spinning animation akin to the wheels in a slot machine. In this animation, the wheels comprise images (typically photographs) of the potential matches. The images may be avatars or other graphical elements. At step 116, the spinning animation has ceased (i.e., reached a stable, static state) and (in this example) three (3) new potential matches are then identified (from the pool) and, at step 118, exposed to the player. The player may then make a match selection (or not). Through this spinning and match presentation, the system accumulates scoring data about each player's selections. In one embodiment, and as depicted at step 120, the system preferably performs an interactive two-sided Gale-Shapley ranking, with the output of the algorithm potentially returned to facilitate the selection of a new set of matches during a next spin cycle. At step 122, and after a set of one or more spins are executed, a test is performed to determine whether an optimal potential match has been found. If not, the system provides such an indication back to the initial match criteria construction component 104. If, however, a match has been found, processing continues in the feedback mechanism 124. At step 126, the optimal match is presented to the player. At step 128, an interactive compatibility test is run to determine whether the individuals that are matched are compatible (based on some defined or configurable criteria). At step 130, the results of the interactive compatibility test (and the matching results) are collected and returned to the matching mechanism 102 to further refine the matching algorithms and/or machine learning model.

One or more of the above-described operations may be combined with one another, or omitted.

Preferably, the back-end of the system is managed by a service provider that operates an online dating service that is offered to users, each of which includes a web application or mobile app configured to provide the slot machine-type operation described above. In a typical use case scenario, a large number of users (clients) access and otherwise interact with the back-end, which operates continuously to generate and provide the potential match pools to the participating users.

While the slot machine spinning preferably is vertical (up or down), a horizontal (left or right) presentation may be used in the alternative. Representative code that may be used to create the animation effect is jQuery slot machine ( . . . //josex2r.github.io/jQuery-SlotMachine/). Preferably, after the player logins for a session, the back-end system delivers the pool of (e.g., 200) potential matches to the player's device. Typically, the user-profile information provided by the back-end server is formatted and transmitted over a network according to an open standard file format such as JavaScript Object Notation (JSON), which is a file format that uses human-readable text to transmit data objects consisting of attribute-value pairs and other data between the server, on the one hand, and the browser/mobile app on the other hand. Communications between mobile app and back-end server occur over HTTP or HTTPS. A particular user-profile comprise image data, and associated metadata including one or more user preferences, one or more attributes and associated values, an indication whether the particular user has already "liked" the player (in a previous session), and other information useful for matching. When the user initiates a spin, the first set of potential matches are identified, and their associated images positioned for display (once the spin ceases). In a representative display, there are six (6) images displayed per spin, with the images presented in two (2) columns of three (3) images. This display configuration is not intended to be limiting. When the player selects another spin cycle, a next set of six (6) images is obtained and rendered, and the operation continues while the number of available spins remains non-zero. The mobile app may interact with the back-end server (to obtain additional profiles) on the second and later spins, but this is not required, as the images may be obtained from the initial set of potential matches originally provided to the app when the player logs in. As described above, and while the player spins for matches, the app accumulates scoring data, with the voting provided by the player's interactions then provided to the back-end in the manner previously described.

Figure 2:
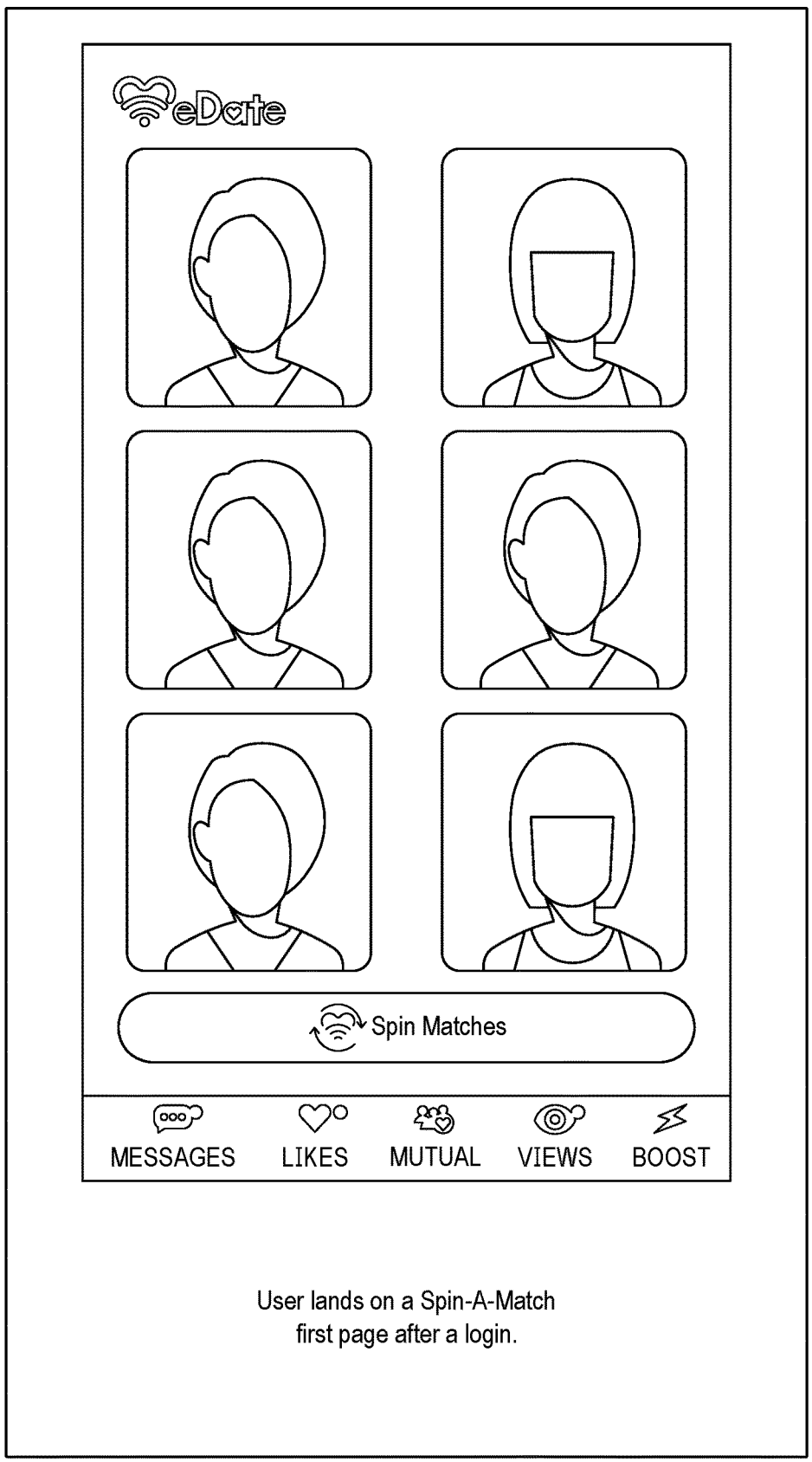
FIG. 2 depicts a representative mobile device display interface depicting a registered user landing on a first page after a login.
Figure 3:
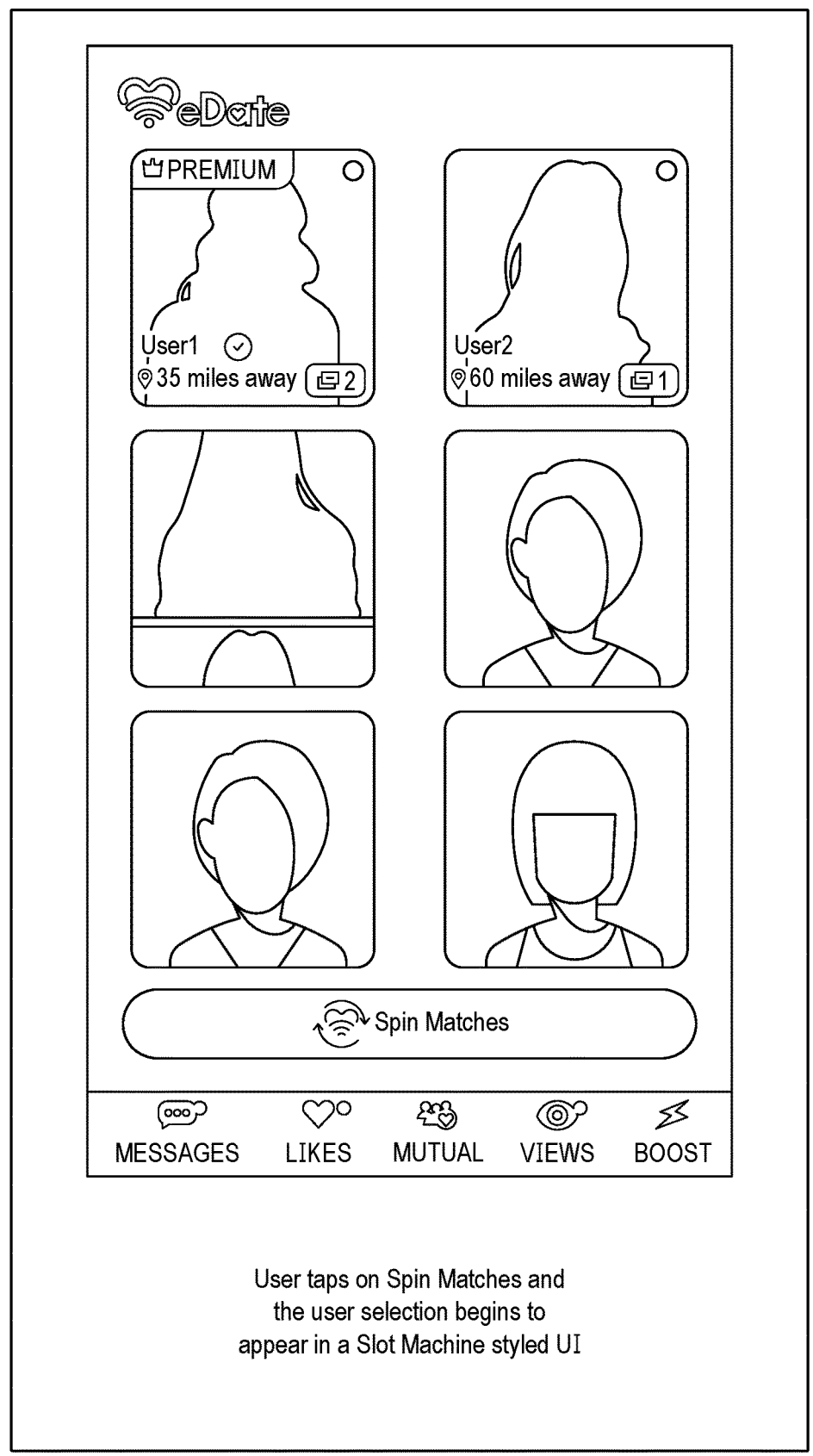
FIG. 3 depicts the mobile device display interface after the user taps on a "Spin Matches" display option, and the resulting spinning animation appearing in the slot machine-style user interface according to this disclosure.
Figure 4:
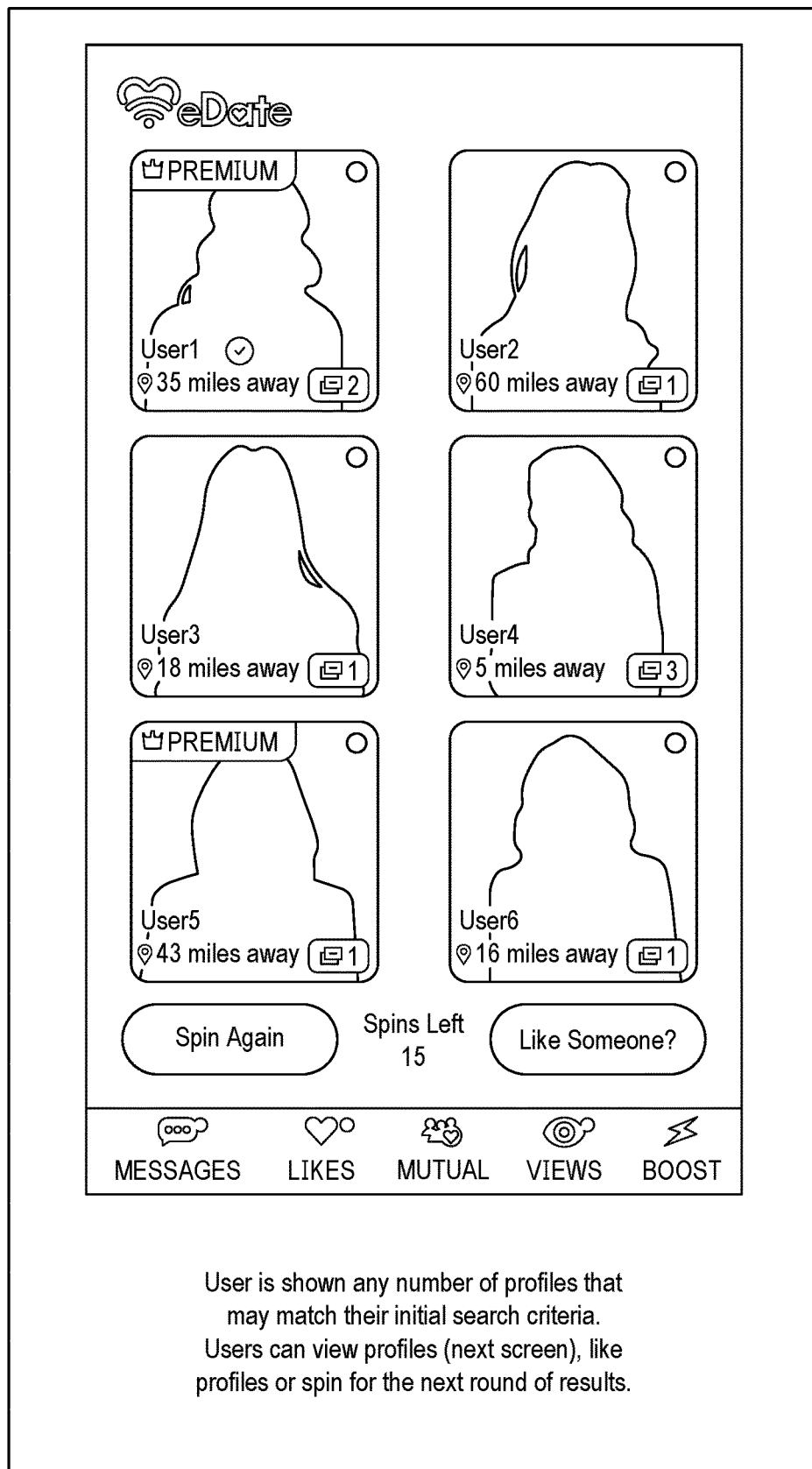
FIG. 4 depicts the user being shown any number of profiles that the system has determined may match the user's initial search criteria.
Figure 5:
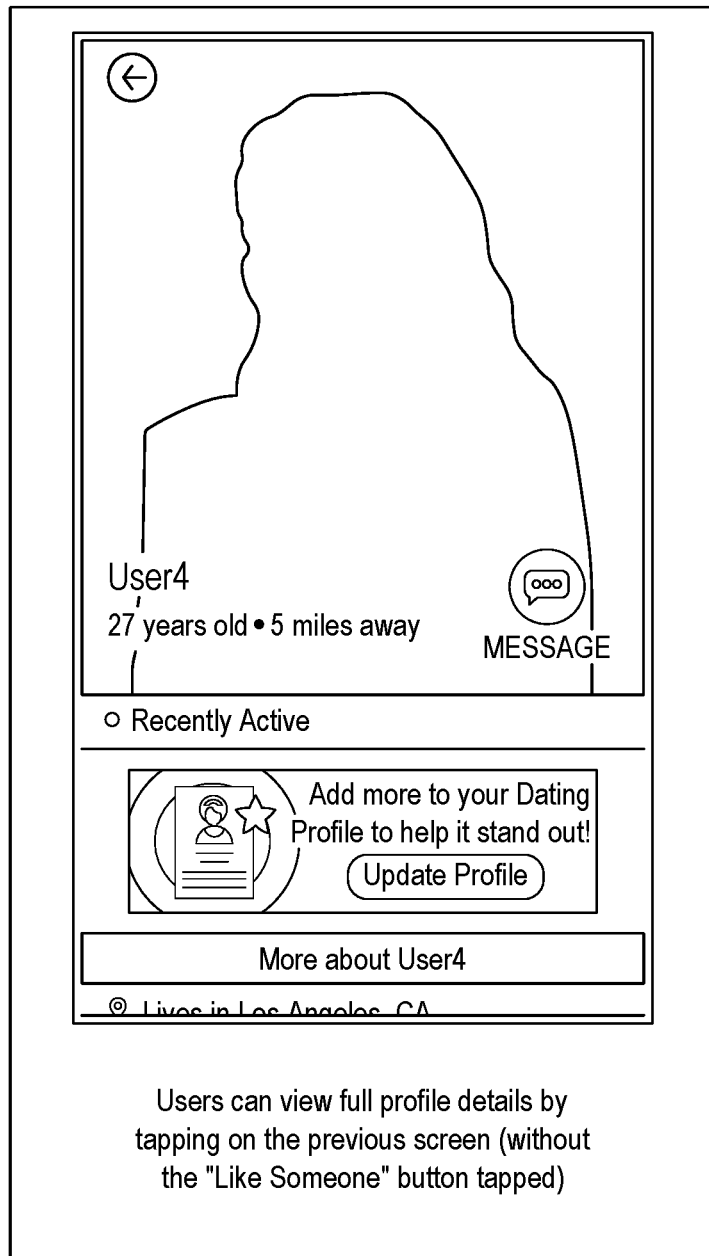
FIG. 5 depicts a particular profile of a match that the user can view.
Figure 6:
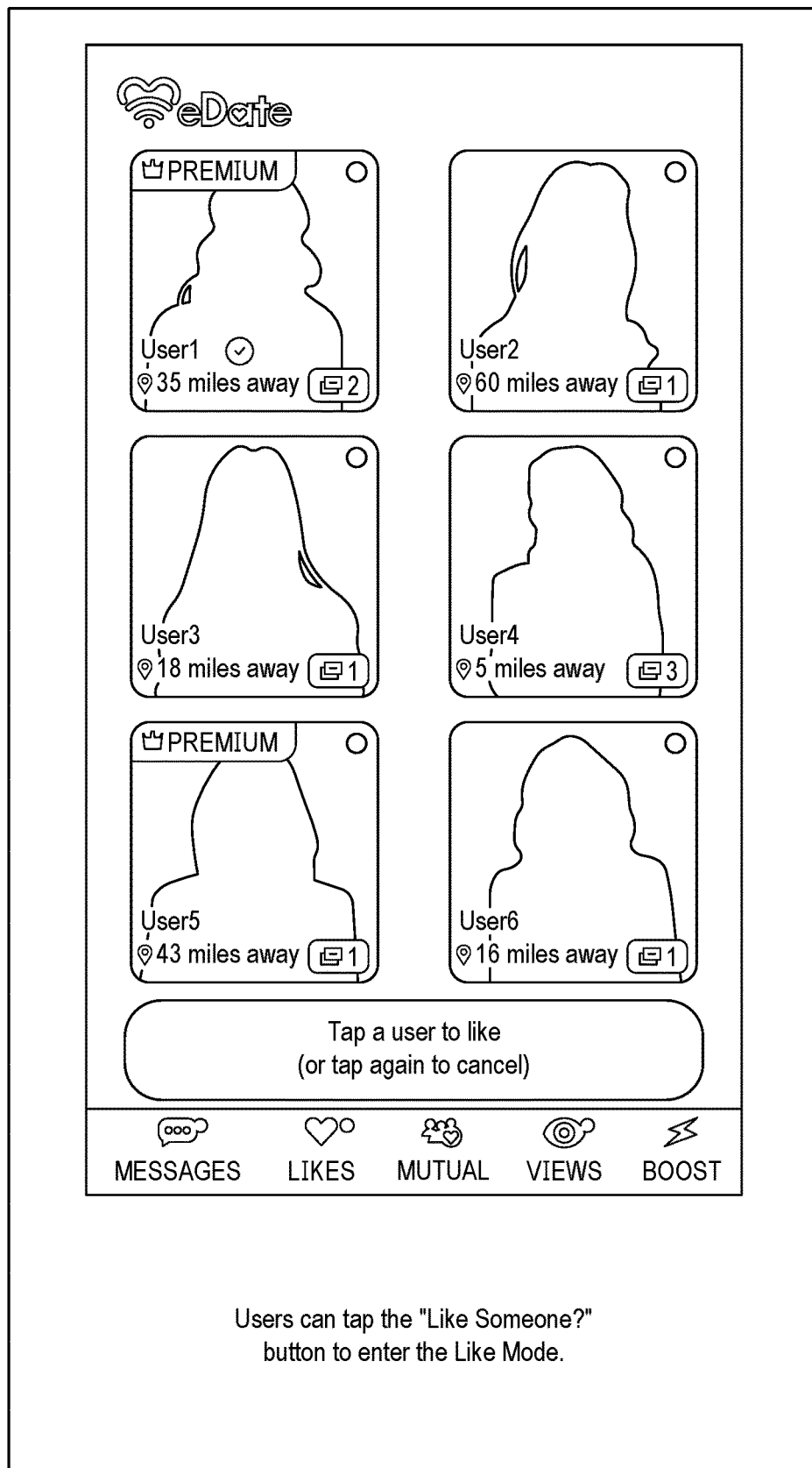
FIG. 6 depicts the user selecting a "Like Someone" option to enter a "Like" mode.
Figure 7:
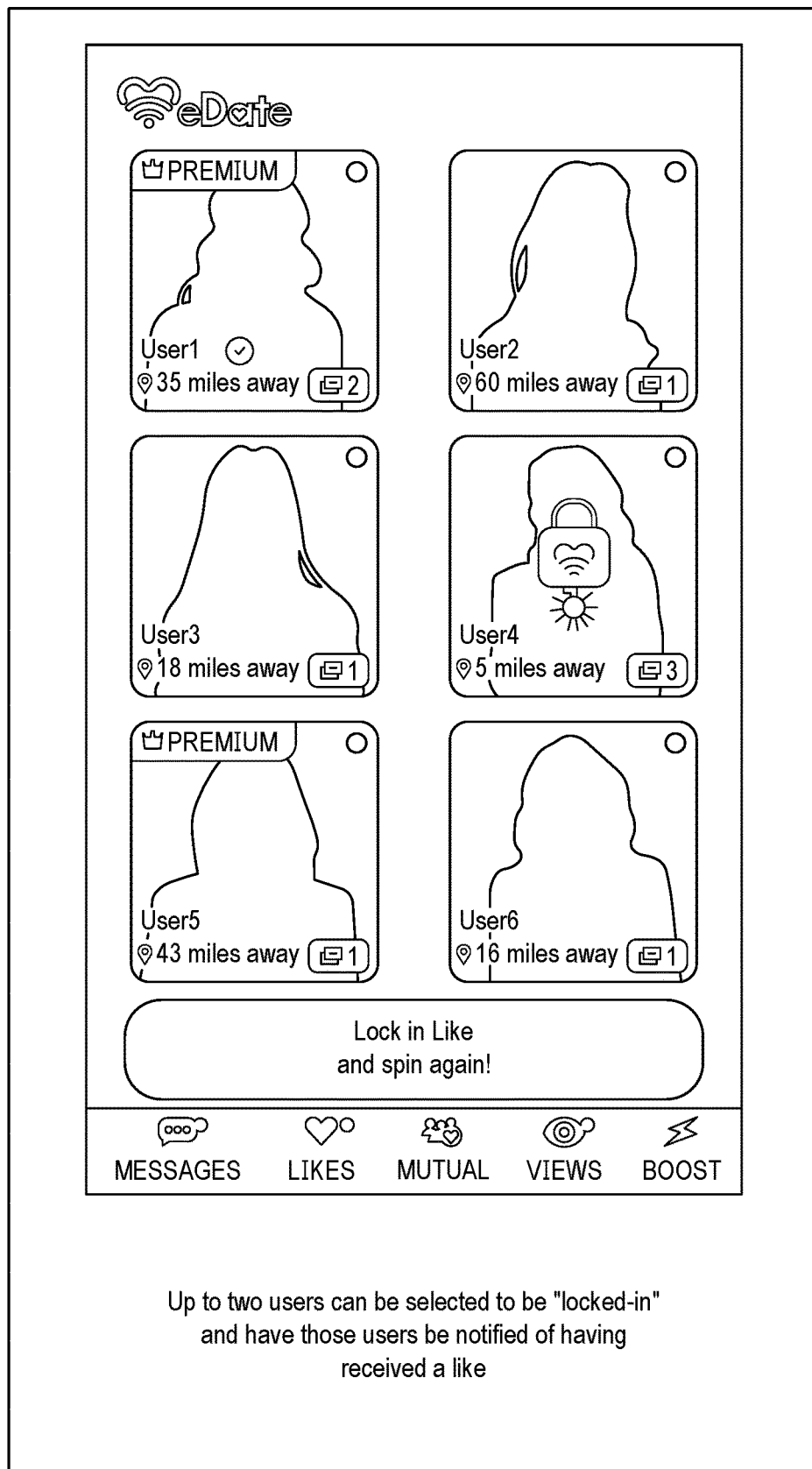
Figure 8:
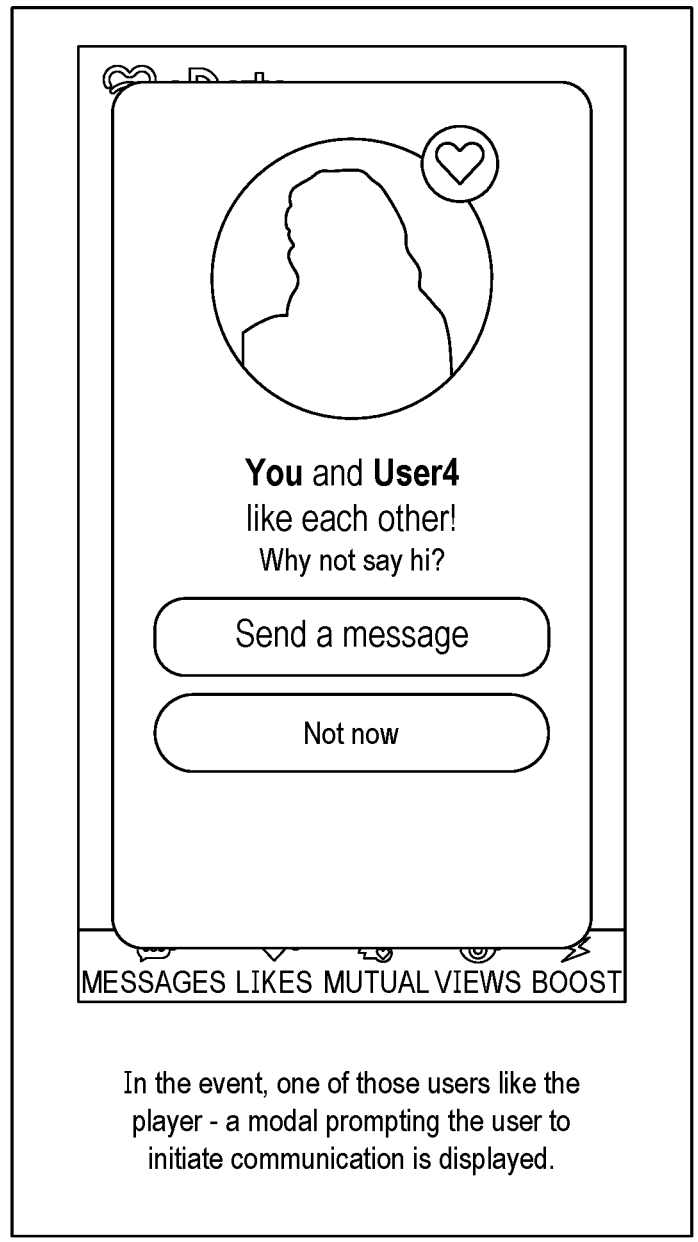
FIG. 8 depicts the user being displayed a modal prompting the user to initiate a communication with a locked-in user who has selected the user.

FIGS. 2-8 depict representative display screens rendered to the player. In particular, FIG. 2 depicts a representative mobile device display interface depicting a registered user landing on a Spin-A-Match™ first page after a login. FIG. 3 depicts the mobile device display interface after the user taps on a "Spin Matches" display option, with the spinning animation appearing in the slot machine-style user interface. FIG. 4 depicts the user being shown a set of profiles that the system has determined may match with the user. FIG. 5 depicts a particular profile of a match that the user can select and view. FIG. 6 depicts the user selecting a "Like Someone" option to enter a "Like" mode of operation. FIG. 7 depicts the user selecting to "lock-in" another user, who is then notified of having received a like. FIG. 8 depicts the user being displayed a modal prompting the user to initiate a communication with a locked-in user who has previously selected the user. Thus, in the preferred embodiment, a player can "lock-in" a profile of some other user, but that other user is not an actual "match" candidate unless the other user also has "locked-in" the player. The requirement of a pair of users "locking" each other before they can be matched may be relaxed.

Unlike typical dating applications that implement a "swipe" type of function to represent a "like," the slot machine-like apparatus and profile display of this disclosure provides a much more engaging user experience.

The disclosed subject matter combines the types of features, tools and algorithms required for online dating or personals with the variable interval reinforcement, ease of play, and constant excitement. This spin-based display approach adds nuance to the assessment of potential matches, balances risk and reward, and it contributes to a sense of "jackpot" that a user experiences after a successful spin. Users are encouraged to log in and play daily for more opportunities to connect with singles and earn rewards. Examples of rewards may include but are not limited to: extra spins, profile boosts (ranks users higher in search results), free messaging, branded merchandise, etc.

Figure 9:
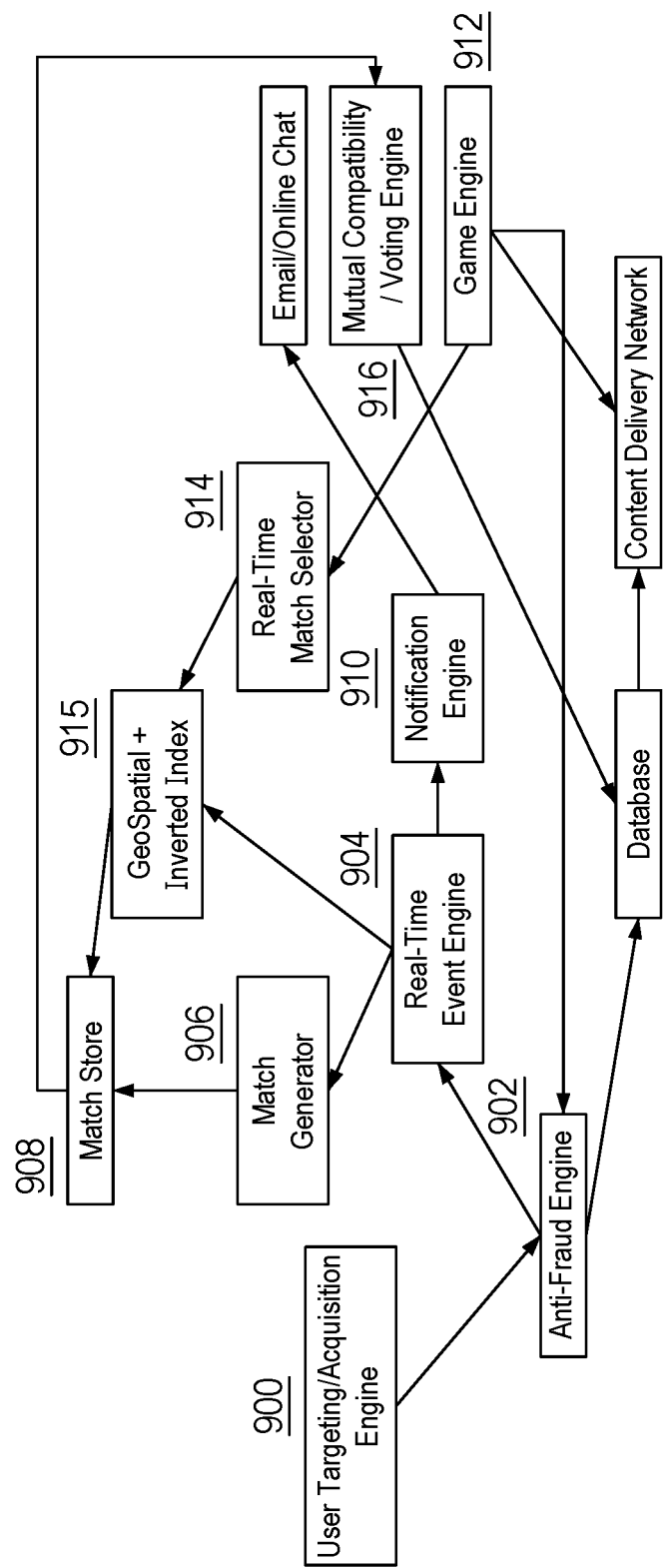
FIG. 9 depicts components of a back-end infrastructure for the system.

FIG. 9 depicts representative components of the back-end infrastructure of the above-described system. As noted, these components typically are software executing in one or more hardware processors. The user targeting/acquisition engine 900 targets users based on specific demographics, e.g., using online advertising platforms and acquisition channels. This component facilitates acquisition of new users for the system. The anti-fraud engine 902 scrubs actual or potential users for fraud/scam signals in order to contain and expel bad actors from the system to ensure a better and more authentic user experience. The anti-fraud engine 902 may also utilize machine learning that has been trained (e.g., using user interaction data captured by the system) to identify acceptable thresholds of user behavior. The real-time event engine 904 receives all new users and activities in order to broadcast them to other parts of the system and engage the data with other processes like matching and notifications. As will be described below, the real-time event engine 904 leverages a highly-efficient distributed queueing system for event management. The match generator 906 identifies potential matches based on the user's attributes and initial and subsequent interactions, scores them, and stores them in a store. In particular, the match store 908 holds match queues (also part of the distributed queueing system) for all users in order for them to be consumed by other processes to allow engaging other users with them (the matches) and to avoid repetitive presentations too quickly. The notification engine 910 periodically sends match-related information to the user with the goal of getting the user to engage with the game, and it also performs real-time notifications when other users are engaging with the user. The game engine 912 is responsible for using a real-time match selector 914 to find and present matches to the user as he or she is playing the game. The real-time match selector 914, typically leveraging the user's geography, uses the above-described geo-spatial inverted index 915 to find the best matches for the user from the match store. The mutual compatibility/voting engine 916 is responsible for engaging the user with choosing the matches that they like/dislike, and it sends that feedback to the matching algorithm for re-incorporation.

Figure 10:
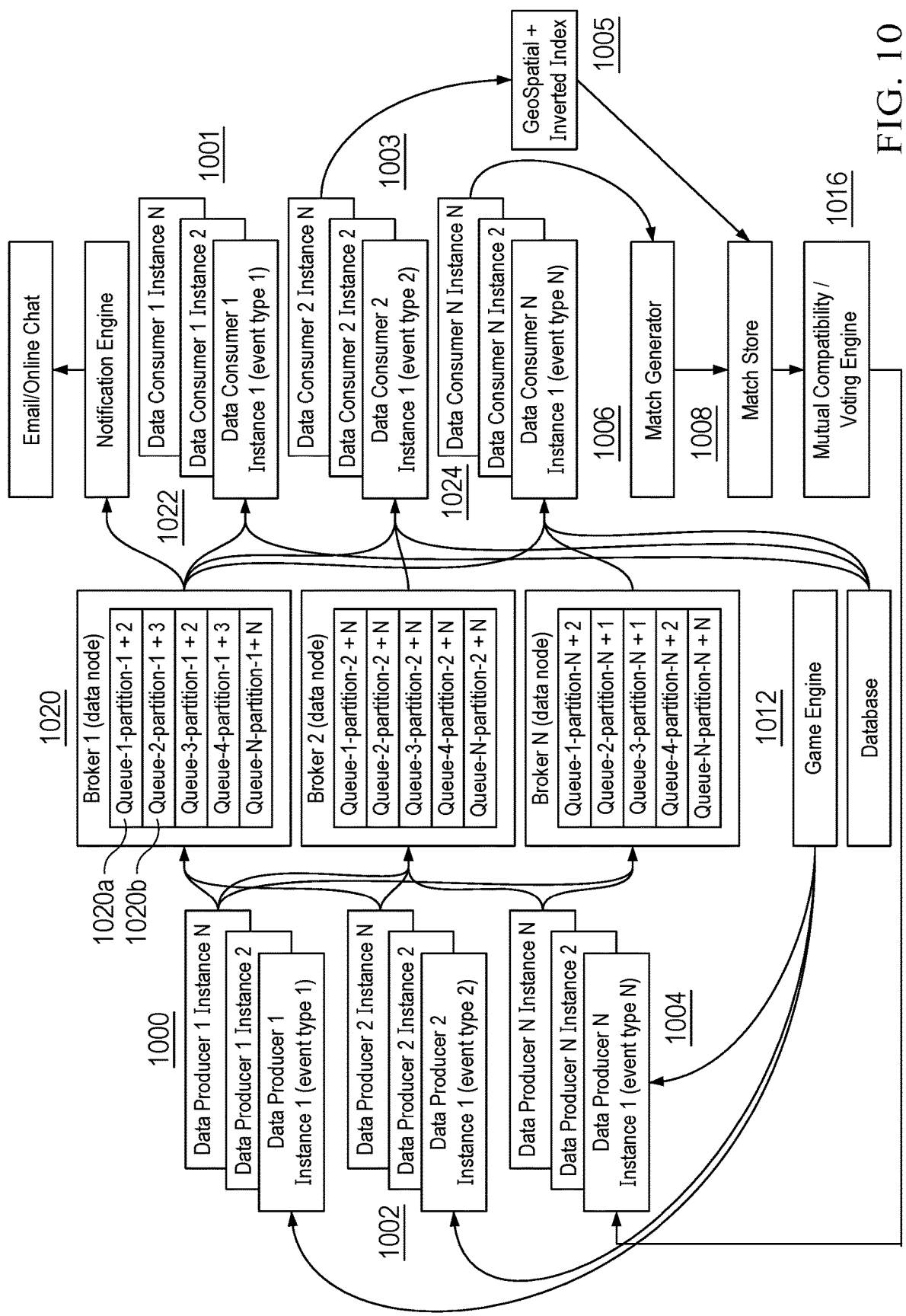
FIG. 10 depicts a distributed and partitioned event queueing architecture that supports a real-time event engine to enable a highly scalable and available system as the number of concurrent users of the system increases.

As noted, the various components (primarily the real-time event engine and the match generator) leverage a distributed queueing system that is now described. By way of background, it should be appreciated that there are many types of actions that occur in the system (e.g., the actions that a user can take when he or she is interacting with the system, the actions that the system itself takes when a user are viewing profiles, etc.) and that such action generates one or more responsive actions. Further, each such action that is taken by an actor (e.g., a user, the system, etc. is a "data producer") and that precipitates one or more response actions that are then intended for consumption by one or more other components in the system (each a "data consumer"). For example, when a new user registers with the system, the new user sign-up function is an "event type," and this event type is a data producer that has 1-to-many data consumers. In the system, there are any number of data producers, and any number of associated data consumers for any particular data producer. Generalizing, each event type is a data producer and has associated therewith 1-to-many "consumers" for events that are generated with respect to that event type. This architecture is depicted in FIG. 10. In particular, and as shown in this example, there are several data producer sets 1000, 1002 and 1004, etc., each of which correspond to different event types. Thus, for example, data producer set 1000 comprises one or more instances of a data producer for event type 1, data producer set 1002 comprises one or more instances of a data producer for event type 2, and so forth. As depicted, and in this example, all of the data producer instances are receiving the outputs (events) from the game engine 1012, which as noted above is used for using a real-time match selector (not shown) to find and present matches to the user as he or she is playing the game. As also depicted, data producer 1004 is shown receiving events from the match generator 1006, match store 1008 and mutual compatibility/voting engine 1016 components. As also shown, the system has spawned a plurality of data consumer sets 1001, 1003 and 1005, etc., with each data consumer set associated with a particular event type. Thus, for example, data consumer set 1001 comprises one or more instances of a data consumer for event type 1, data consumer set 1003 comprises one or more instances of a data consumer for event type 2, and so forth. Data consumer set 1001 thus is associated with data producer set 1000 by virtue of the event type.

As also depicted in FIG. 10, the system comprises a set of data nodes 1020, 1022 and 1024, etc., each of which support a set of distributed queues that are partitioned, preferably by event type (and producer instance when there are multiple producer instances). Thus, for example, data node 1020 supports queues 1020*a-n*, with (in this example scenario) queue 1020*a* receiving events of type 1 produced from instance 2, queue 1020*b* receiving events of type 1 produced from instance 3, and so forth. Preferably, each data producer instance provides its events (which are associated with event type N) to each of the set of data nodes 1020, 1022, 1034. Likewise, and via the brokers and their associated partitioned queues, each data consumer associated with a particular data producer (once again, per event type) receives corresponding events for the event type and then acts on those events. The brokers and the associated queues provide for very high throughput, enabling multiple data producers to generate events (by event type) that are then consumed by multiple data consumers for response. In the example described above, a user sign-up is an event type that generates an event that is then consumed by multiple data consumers (e.g., adding the new user into the match database, sending a confirmatory email regarding registration, reviewing the user's attributes so that the system can start generating matches, etc.). As can be appreciated, and because the various components (such as depicted in FIG. 9) operate concurrently and continuously with respect to a large number of users and other system activity, there are a large number of events (of varying event types) being generated. Some examples of event type include, without limitation, image upload, lock/like, message sent, profile block, profile registration, profile removal, profile update, profile verification, profile view, spin event, and the like. The distributed queueing system as described above enables the system to scale reliably and with reduced latency (for the real-time matching) as the number of users increases and those users are concurrently generating events of varying event types.

In particular, the cluster of distributed queues that are partitioned as depicted in FIG. 10 allow for very fast read/writes of event data. As described, the distributed queues capture data as streams of events in real-time from several event sources (user applications, databases, matching systems, and others). In the real-time event management approach utilized herein, a (persistent) queue is provided to take advantage of O(1) reads and write operations as an append-only file. This boosts performance and decouples it from data size allowing for higher throughput, less contention, and alleviating the disk bottleneck. Relatedly, disk operations are improved via asynchronous batch flushing from virtual memory instead of smaller I/O operations. To minimize the copying of data between the operating system's kernel and the broker's memory space, Linux's sendfile operation is used, because keeping the data copying within the kernel itself provides significant additional efficiency. Further, event streams are stored durably to disk via mapped memory for later fetching by data consumers, thereby enabling data consumers to manipulate, analyze, and react to them in real-time and after the fact. As noted, and using the brokers, events are routed to different destination technologies (the other system components) as needed, and by event type.

As noted, the queues in the data nodes are distributed. As one example implementation, the system comprises clusters that include multiple servers (the brokers) that host the queues and make them available, preferably over a high-performance binary network protocol that supports multiple versions of each type of event allowing for seamless data evolution and changes. Each cluster is highly scalable and fault-tolerant; if any of its servers fails, the other servers will take over their work to ensure continuous operations without any data loss. As noted, preferably events are split up into queues and durably stored in topics. Preferably, they are written to virtual memory and flushed to disk asynchronously while also being replicated to other cluster members to ensure scalability and fault-tolerance. Topics can be written to and read from by multiple producers and consumers in parallel. Topics, and hence event data, are not only replicated to protect against data loss but also partitioned to further speed up reads and writes.

Operations and actions that users take or that the system detects/emits (each a data producer) are pushed into the queues and one or more (typically several) event consumers process that data in order to analyze users, their activities, likes, dislikes, logins, messages, etc. This analysis is used to enrich the system's metadata for subsequent handling by more complex engines like anti-fraud, match generator, notifications, and mutual compatibility/vote processing. Using distributed queues and the producer/consumer model allows the entire system to function in a reactive manner responding to user activities in real-time instead of having to poll and check continuously, which would otherwise waste precious resources and adding system overhead. It also allows scaling of the data infrastructure as well as individual components to handle increasing load, to keep latency low, and to perform more advanced operations, all without disrupting any user's experience.

Enabling Technologies

Typically, the mobile device app connects to the server environment providing the "service" in a secure manner, e.g., via a TLS-secured connection, and must be authenticated (or otherwise authorized) into a user session.

The "service" preferably is hosted in a cloud-based environment that comprises a set of services (or components). The service may be implemented using a set of computing resources that are co-located or themselves distributed. Typically, a service is implemented in one or more computing systems. The computing platform (or portions thereof) may be implemented in a dedicated environment, in an on-premises manner, as a cloud-based architecture, or some hybrid. A typical implementation of the compute infrastructure is in a cloud-computing environment. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

Generalizing, the cloud service is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the cloud service comprises a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the functionality shown in FIG. 1 is non-transitory.

A given implementation of the disclosed subject matter is software written in a given programming language that runs on a server on commodity hardware platform running an operating system, such as Linux. One or more of the system components may be implemented as well as a virtual machine or appliance, or in any other tangible manner.

While given components of the system have been described separately, one of ordinary skill will appreciate that some of the functions may be combined or shared in given instructions, program sequences, code portions, and the like.

The functionality may be implemented with other application layer protocols besides HTTP/HTTPS, or any other protocol having similar operating characteristics.

There is no limitation on the type of computing entity that may implement the client-side or server-side of any communication. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

The above-described method, system and technologies may be used to support use cases other than online dating.

The techniques herein provide for improvements to technology or technical field, as well as improvements to various technologies, all as described.

We claim:

1. A method operative in a computing infrastructure in which one or more data producers generate events that are consumed by one or more data consumers, wherein users interact with the computing infrastructure via user computing devices having display interfaces, comprising:

deploying a set of queues, wherein a particular queue receives events associated with an event type from one or more data producers and selectively provides the events to one or more data consumers that subscribe to the event type; and as users interact with the computing infrastructure, processing events associated with each event type using the set of queues, wherein the event types include: (i) a first type associated with a matching algorithm that, responsive to an event of the first type generated by a first data producer, generates a pool of candidate matches for a particular user having a user profile, (ii) a second type that, responsive to an event of the second type generated by a second data producer, delivers a set of images associated with the pool of candidate matches to a particular user computing device to facilitate rendering at the user computing device, as a set of display animations over two or more display cycles, of subsets of user profile images, wherein, respective first and second subsets of the user profile images differ from one another across at least first and second display cycles, and wherein a number of available display cycles is decremented after each display cycle; and (iii) a third type that, responsive to an event of the third type generated by a third data producer, associates a selected user profile image to the user profile, the selection having occurred at the user computing device after a particular display animation reaches a given steady state.

2. The method as described in claim 1 wherein the event types include (iv) a fourth type that, responsive to an event of the fourth type generated by a fourth producer, locks the selected user profile.

3. The method as described in claim 2 wherein the event types include (v) a fifth type that, responsive to an event of the fifth type generated by a fifth producer, generates a match opportunity.

4. The method as described in claim 3 further including providing the match opportunity to one of: the particular user, the user associated with the selected user profile, and to both the particular user and the user associated with the selected user profile.

5. The method as described in claim 1 wherein the matching algorithm generates the pool of candidate matches at least in part based on one or more preferences or attributes associated with the particular user, and preferences or attributes associated with one or more other participating users.

6. The method as described in claim 5 wherein the matching algorithm implements a term frequency-inverse document frequency (TF-IDF) search function from information derived in the user profile.

7. The method as described in claim 5 wherein the matching algorithm also uses information about past matching activity to generate the pool of candidate matches.

8. The method as described in claim 1 wherein the display animation is a spinning display of the user profile images, and wherein the given steady state is a cessation of the spinning display.

9. The method as described in claim 1 wherein the images are associated with a pool of candidate matches that are associated with the particular user with respect to a defined geographic proximity.

10. The method as described in claim 1 wherein the processing of events includes storing events associated with an event type in the particular queue via mapped memory.

* * * * *